United States Patent
Yoshida et al.

(10) Patent No.: US 10,500,668 B2
(45) Date of Patent: Dec. 10, 2019

(54) MACHINE LEARNING DEVICE, ARC WELDING CONTROL DEVICE, ARC WELDING ROBOT SYSTEM, AND WELDING SYSTEM

(71) Applicant: FANUC CORPORATION, Yamanashi (JP)

(72) Inventors: Shigeo Yoshida, Yamanashi (JP); Masayoshi Mori, Yamanashi (JP); Kazutaka Nakayama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 332 days.

(21) Appl. No.: 15/222,051

(22) Filed: Jul. 28, 2016

(65) Prior Publication Data

US 2017/0028499 A1 Feb. 2, 2017

(30) Foreign Application Priority Data

Jul. 31, 2015 (JP) .................. 2015-152107

(51) Int. Cl.
| | |
|---|---|
| *B23K 9/095* | (2006.01) |
| *B25J 9/16* | (2006.01) |
| *B23K 9/28* | (2006.01) |

(52) U.S. Cl.
CPC .......... *B23K 9/0956* (2013.01); *B23K 9/0953* (2013.01); *B23K 9/287* (2013.01); *B25J 9/163* (2013.01); *Y10S 901/02* (2013.01); *Y10S 901/42* (2013.01)

(58) Field of Classification Search
CPC .... B23K 9/0956; B23K 9/0953; B23K 9/287; B23K 9/163; Y10S 901/02; Y10S 901/42; B25J 9/163
See application file for complete search history.

(56) References Cited

U.S. PATENT DOCUMENTS

| | | | | |
|---|---|---|---|---|
| 2005/0102060 | A1* | 5/2005 | Watanabe | ............. B25J 9/1697 700/245 |
| 2013/0223724 | A1* | 8/2013 | Wersborg | ............. B23K 1/0056 382/152 |
| 2017/0032281 | A1* | 2/2017 | Hsu | ...................... B23K 9/0953 |

FOREIGN PATENT DOCUMENTS

| | | |
|---|---|---|
| DE | 19539038 A1 | 4/1997 |
| DE | 19724986 A1 | 12/1998 |
| JP | 62-33070 A | 2/1987 |

(Continued)

OTHER PUBLICATIONS

Sumesh et al., "Use of Machine Learning Algorithms for Weld Quality Monitoring using Acoustic Signature", Mar. 12-13, 2015, 2nd International Symposium on Big Data and Cloud Computing, pp. 316-322 (Year: 2015).*

(Continued)

*Primary Examiner* — Kamran Afshar
*Assistant Examiner* — Brent Johnston Hoover
(74) *Attorney, Agent, or Firm* — Hauptman Ham, LLP

(57) ABSTRACT

A machine learning device which learns to determine at least one arc welding condition includes a state observation unit which observes a state variable consisting of at least one physical quantity regarding the arc welding and the at least one arc welding condition at least during or after the arc welding, and a learning unit which learns a change in the at least one physical quantity observed by the state observation unit and the at least one arc welding condition in association with each other.

10 Claims, 4 Drawing Sheets

(56) References Cited

FOREIGN PATENT DOCUMENTS

| | | |
|---|---|---|
| JP | 08-075895 A | 3/1996 |
| JP | 10-249525 A | 9/1998 |
| JP | 2000351071 A | 12/2000 |
| JP | 3200102 B2 | 8/2001 |
| JP | 2006-341283 A | 12/2006 |
| JP | 2010-36231 A | 2/2010 |
| JP | 3197100 U | 4/2015 |

OTHER PUBLICATIONS

Watkins et al., "Q-learning", May 1992, Machine Learning, vol. 8, Issue 3-4, pp. 279-292 (Year: 1992).*

Zhang et al., "Multisensor-based real-time quality monitoring by means of feature extraction, selection and modeling for Al alloy in arc welding", Mar. 5, 2015, Mechanical Systems and Signal Processing, vols. 60-61, Aug. 2015, pp. 151-165 (Year: 2015).*

* cited by examiner

MACHINE LEARNING DEVICE, ARC WELDING CONTROL DEVICE, ARC WELDING ROBOT SYSTEM, AND WELDING SYSTEM

RELATED APPLICATIONS

The present application claims priority to Japanese Patent Application Number 2015-152107, filed Jul. 31, 2015, the disclosure of which is hereby incorporated by reference herein in its entirety.

BACKGROUND OF THE INVENTION

1. Field of the Invention

The present invention relates to a machine learning device for determining at least one arc welding condition, an arc welding control device, an arc welding robot system, and a welding system.

2. Description of the Related Art

In general, in an arc welding system for welding a workpiece using a robot, the arc welding is carried out in accordance with welding conditions described in a pre-prepared program. In most cases, the welding conditions are determined based on operator's experience and native intuition. Enhancing the arc welding quality and the operability mainly relies on the knowledge of the operator with regard to welding technology. Therefore, the arc welding quality or the operability may depend upon the skill level of the operator who adjusts the welding conditions.

In recent years, at arc welding sites, there has been a shortage of welders highly skilled in arc welding. At sites where it is impossible to secure the necessary professional arc welders, sufficient quality and operability may not be obtained even by introduction of an arc welding robot system.

In view of these circumstances, some solutions to automatic adjustments of the welding conditions have been proposed. In Japanese Unexamined Patent Publication (Kokai) No. 2000-351071, an actual measurement value which is obtained by processing an image of a molten pool which has been picked up by an infrared camera is compared with a pre-prepared target value to control at least one welding condition. Japanese Patent No. 3200102 discloses a method for determining welding conditions such as welding speed, arc current, or arc voltage, by a neural network.

SUMMARY OF THE INVENTION

The target value described in Japanese Unexamined Patent Publication No. 2000-351071 corresponds to characteristic data of the molten pool which is formed when ideal welding is carried out beforehand. In other words, in Japanese Unexamined Patent Publication No. 2000-351071, it is necessary to perform ideal welding beforehand. In order to perform ideal welding, a highly skilled welder is necessary, and accordingly, there is a case where it is impossible to prepare the target value when it is required. In Japanese Patent No. 3200102, when a neural network is configured by learning, it is necessary to determine optimum heat inputs and welding speeds with respect to a plurality of plate thicknesses beforehand and expertise regarding welding is required.

The present invention has been completed in view of these circumstances and is aimed to provide a machine learning device, an arc welding control device, an arc welding robot system, and a welding system, wherein optimum welding conditions can be automatically prepared without a skilled operator or expertise.

In order to achieve the aforementioned object, according to the first aspect of the invention, there is provided a machine learning device which learns to determine at least one arc welding condition, comprising a state observation unit which observes a state variable comprising at least one physical quantity regarding the arc welding at least during or after the arc welding and the at least one arc welding condition, and a learning unit which learns a change in the at least one physical quantity observed by the state observation unit and the at least one arc welding condition in association with each other.

According to the second aspect of the invention, in the first aspect of the invention, the learning unit comprises a reward computation unit which computes a reward based on the at least one physical quantity observed by the state observation unit, and a function update unit which updates a function to determine the at least one arc welding condition from the current state variable based on the reward computed by the reward computation unit.

According to the third aspect of the invention, in the second aspect of the invention, the reward computation unit includes a reward condition setting unit which sets a reward condition and computes the reward based on the reward condition set by the reward condition setting unit.

According to the fourth aspect of the invention, in the third aspect of the invention, the learning unit carries out machine learning of a change in the at least one physical quantity and the at least one arc welding condition in association with each other so that the reward computed by the reward computation unit is maximum.

According to the fifth aspect of the invention, in any of the second to fourth aspects of the invention, the learning unit further comprises a learning result storage unit which stores the learning result that the function update unit has learned.

According to the sixth aspect of the invention, there is provided an arc welding control device comprising a machine learning device according to any one of the first to fifth aspects of the invention, and a decision making unit which decides the at least one arc welding condition and an optimum amount of adjustment of the at least one arc welding condition, from the current state variable, based on the learning result of the learning unit.

According to the seventh aspect of the invention, in the sixth aspect of the invention, the learning unit learns or repeatedly learns the adjustment of the at least one arc welding condition during the execution of arc welding.

According to the eighth aspect of the invention, the sixth or seventh aspect of the invention further comprises an arc welding execution unit which executes the arc welding based on the result output from the machine learning device.

According to the ninth aspect of the invention, there is provided an arc welding robot system comprising a robot which carries out arc welding, a physical quantity measurement unit which measures at least one physical quantity regarding the arc welding at least during or after the execution of the arc welding by the robot, and an arc welding control device according to any one of the sixth to eighth aspects of the invention.

According to the tenth aspect of the invention, the arc welding robot system according to the ninth aspect of the invention further comprises a positioner which changes the posture of a workpiece to be welded, wherein the robot and the positioner carry out arc welding while performing operations associated with each other.

According to the eleventh aspect of the invention, there is provided a welding system comprising a plurality of arc welding robot systems according to the ninth or tenth aspect of the invention, and a communication unit which mutually connects the plurality of arc welding robot systems, wherein the communication unit transmits and receives at least one of at least one physical quantity observed by the at least one state observation unit and the learning result stored in the at least one learning result storage unit among the plurality of arc welding robot systems.

According to the twelfth aspect of the invention, the eleventh aspect of the invention further comprises a host computer connected to the communication unit, wherein at least one of the at least one physical quantity observed by the at least one state observation unit and the learning result stored in the at least one learning result storage unit among the plurality of arc welding robot systems is stored in the host computer.

The aforementioned object, features and merits and other objects, features and merits of the present invention will become more apparent from the detailed description of the representative embodiments of the present invention illustrated in the accompanying drawings.

DETAILED DESCRIPTION

Figure 1:
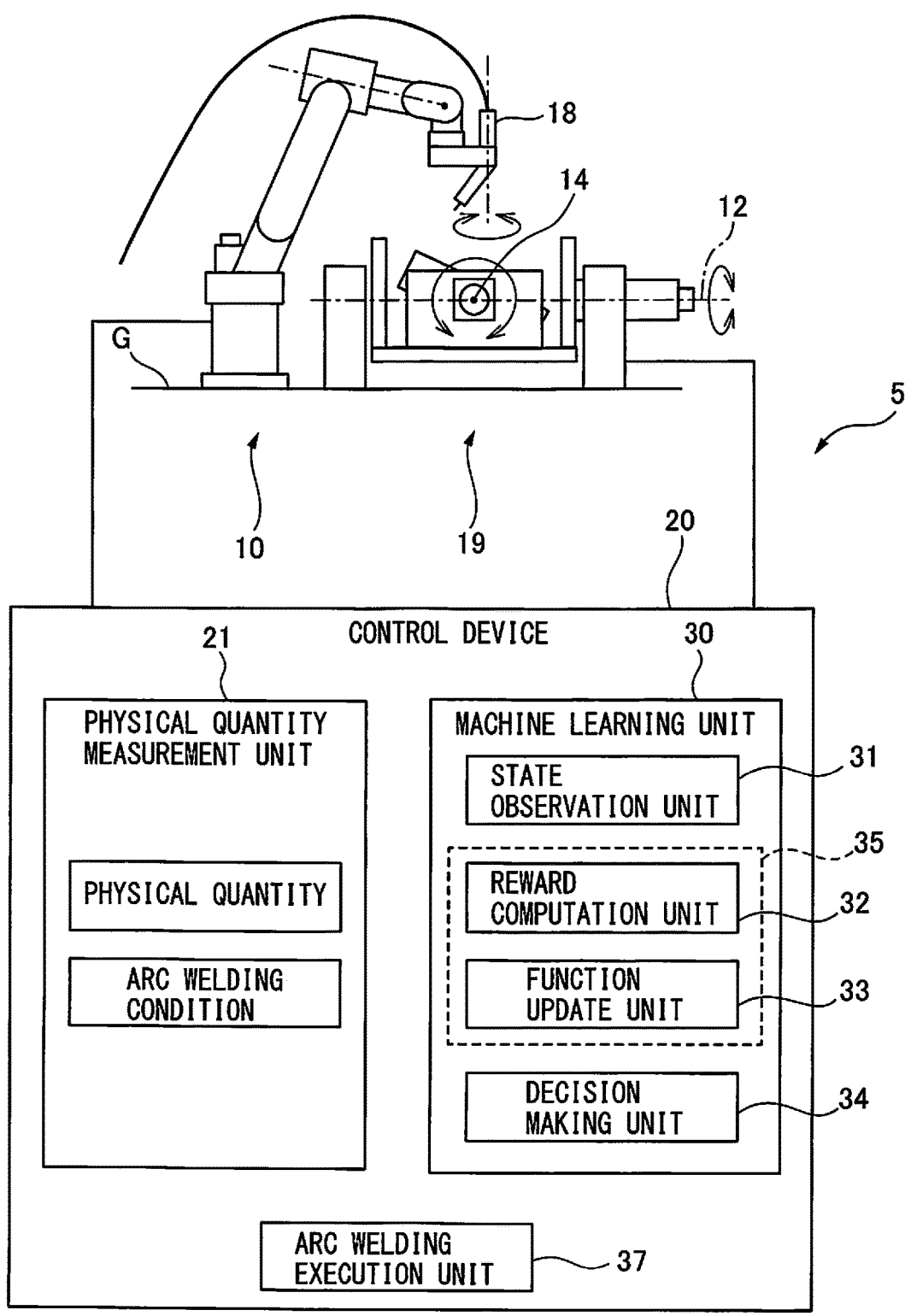
FIG. 1 is a block diagram including a front elevational view and a right side view of an arc welding robot system according to a first embodiment of the present invention.

The embodiments of the invention will be discussed below with reference to the accompanying drawings. In the drawings, the same or corresponding components are assigned the same reference numerals. For the sake of clarity, the scale of the drawings has been appropriately changed.

FIG. 1 is a block diagram including a front elevational view and a right side view of an arc welding robot system according to the first embodiment of the present invention. As can be seen in FIG. 1, an arc welding robot system 5 of this embodiment is essentially composed of a robot 10 provided with a welding torch 18 which is adapted to arc-weld a workpice (not shown) to be welded, a positioner 19 which holds the workpiece and changes the posture thereof, and a controller 20 which controls these components. Alternatively, the welding torch 18 may be provided on the positioner 19 and the arc welding robot 10 may hold the workpice.

The robot 10 is, for example, a vertically articulated robot. The positioner 19 can position the workpiece which is secured to the upper surface of the positioner 19 so as to rotate about a first axis 12 parallel with the placement surface G and about a second axis 14 perpendicular to the first axis 12. The rotational movement about the first axis 12 and the second axis 14 can be controlled as additional shafts of the robot 10. Consequently, a simpler control of the entire arc welding robot system 5 including the robot 10 and the positioner 19 can be made. The robot 10 and the positioner 19 carry out arc welding while performing cooperative movement.

The controller 20 is a digital computer and includes a physical quantity measurement unit 21 which measures at least one physical quantity regarding the arc welding at least during or after the arc welding operation.

The physical quantity regarding the arc welding can include, for example, a welding current waveform and a welding voltage waveform, obtained by a current/voltage measuring unit of the arc welding robot system 5. Furthermore, the physical quantity regarding the arc welding can include, for example, image data of a welded portion picked up by an image pickup unit as well as an outer appearance of a weld bead, an excess weld metal height of the bead, a bead width, which are obtained by processing the image data and an amount of generated spatter. Note that the amount of generated spatter can be obtained from a spatter crater formed in the workpiece during welding. Furthermore, the physical quantity regarding the arc welding can include, for example, an amount of penetration obtained by a penetration measurement unit and an arc sound waveform obtainer by a sound collection unit. These physical quantities are those which vary in accordance with a change of at least one arc welding condition.

Moreover, the arc welding conditions may include at least one of, for example, a welding method, a welding current, a welding voltage, a welding wire feed speed, a welding speed, an amount of adjustment of a weld waveform, a length of extension of a welding wire, push/drag angles of a welding torch, an aim angle of a welding torch, a torch aim position, a flow rate of shielding gas, a weaving condition, an arc sensor condition, and an offset amount of the welding position in a multi-layer welding. These physical quantities are measured by respective predetermined measuring means. Moreover, the amounts of adjustment of the arc welding conditions are determined by a machine learning unit 30 which will be discussed hereinafter. Note that, the arc welding conditions may be included in the physical quantity regarding the arc welding.

Figure 2:
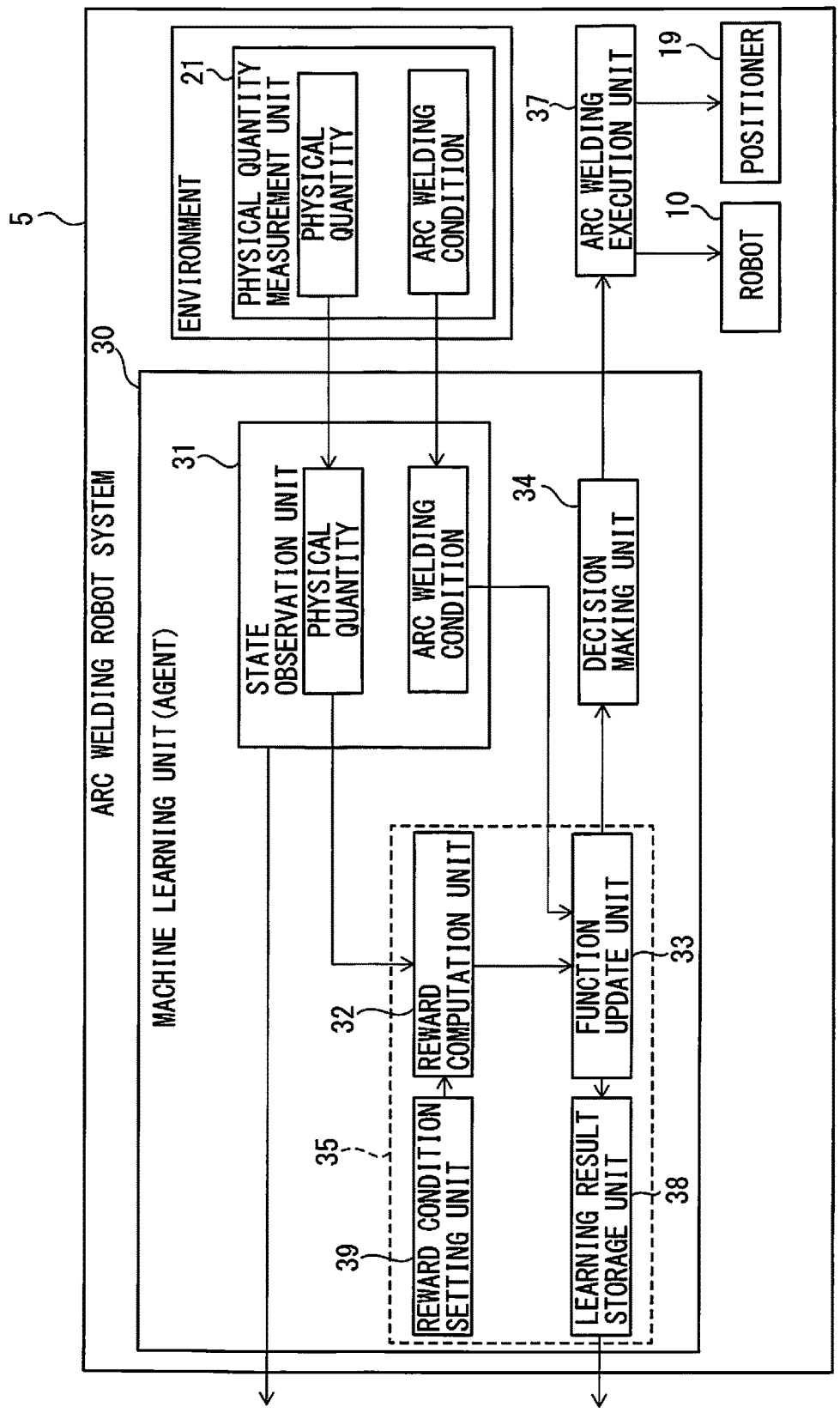
FIG. 2 is an enlarged block diagram of a machine learning unit, etc.

As can be seen in FIG. 1, the controller 20 further includes the machine learning unit 30. The machine learning unit 30 may be externally attached to the controller 20 as a machine learning device. With reference to FIG. 2 which shows an enlarged view of the machine learning unit 30, it includes a state observation unit 31 which observes a state variable consisting of at least one physical quantity regarding the arc welding and at least one arc welding condition at least during or after the arc welding.

The state observation unit 31 stores the physical quantities and the welding conditions as mentioned above together with at least one of the weld performing conditions including the kind of the shielding gas, the joint shape, the plate thickness, the posture of the base material, an amount of gap, the kind of the welding wire, and the diameter of the welding wire, as well as the observed time.

Furthermore, the machine learning unit 30 includes a learning unit 35 which learns a change in at least one physical quantity observed by the state observation unit 31 and at least one arc welding condition in association with each other.

The learning unit 35 can carry out various types of learning, such as supervised learning, unsupervised learning, semi-supervised learning, reinforcement learning, transduction learning, or multitask learning. In the following discussion, it is assumed that the leaning unit 35 carries out reinforcement learning by Q-learning.

As may be understood from FIG. 2, the machine learning unit 30 corresponds to an agent in the reinforcement learning. Moreover, the state observation unit 31 detects the state of the environment.

The learning unit 35 which carries out the reinforcement learning includes a reward condition setting unit 39 which sets reward conditions, a reward computation unit 32 which computes a reward based on at least one physical quantity observed by the state observation unit 31 and the reward conditions, and a function update unit 33 (Artificial Intelligence) which updates a function to determine at least one arc welding condition, e.g., an action value function (action value table), from the current state variable, based on the reward computed by the reward computation unit 32. As a matter of course, the function update unit 33 may update other functions. Furthermore, the learning unit 35 includes a learning result storage unit 38 which stores the result that the function update unit 33 has learned.

The reward conditions set by the reward condition setting unit 39 are determined corresponding to, for example, the stability of the physical quantities, the cycle time, an amount of generated spatter, the welding quality, a consumption of welding wire, a consumption of energy. For example, it is judged that the physical quantity is stable, that is, the fluctuation in the physical quantity is small, the reward is increased, and otherwise, the reward is reduced. Furthermore, when the recycle time is long, the reward is reduced and when the recycle time is short, the reward is increased. Likewise, when the amount of generated spatter is small, the reward is increased and when the amount of generated spatter is large, the reward is reduced. When the welding quality is high, the reward is increased, and when the welding quality is low, the reward is reduced. Furthermore, when the consumption of the welding wire and/or the consumption of energy increases, the reward is reduced and when the consumption of the welding wire and/or the consumption of energy decreases, the reward is increased. Regarding a judgment like this, means for obtaining respective data are provided and thresholds, etc., are predetermined for the respective data.

Moreover, the machine learning unit 30 includes a decision making unit 34 which decides at least one arc welding condition and an optimum amount of adjustment of the at least one arc welding condition, from the current state variable, based on the learning result of the learning unit 35. The decision making unit 34 learns the selection (decision) of a more preferable action. Note that the decision making unit 34 may be included not in the machine learning unit 30 but in the controller 20. The machine learning unit 30 further includes an arc welding execution unit 37 which executes the arc welding based on the result outputted from the machine learning device.

Figure 3:
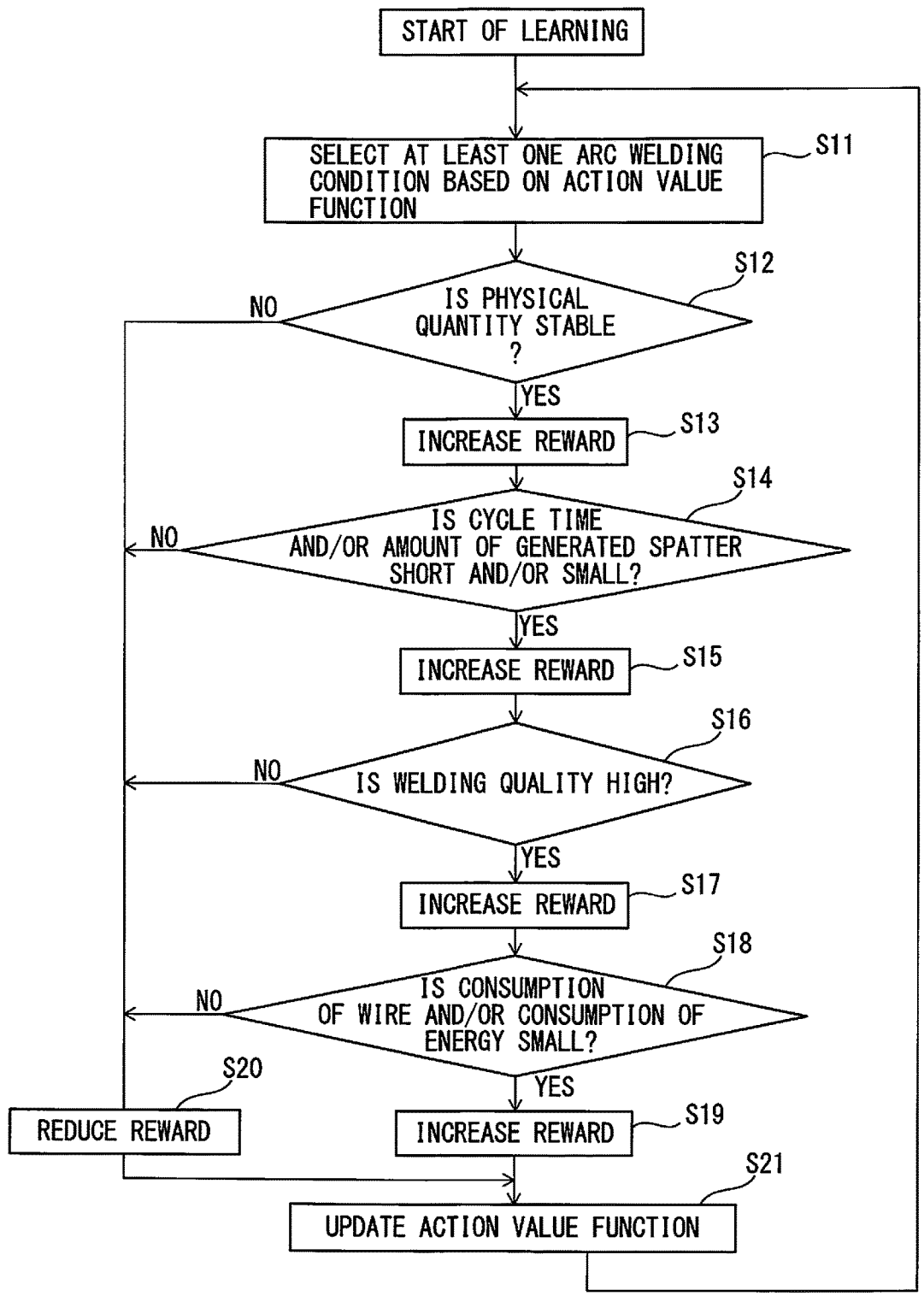
FIG. 3 is a flow chart showing the operations of the machine learning unit.

FIG. 3 is a flow chart showing the operation of the machine learning unit. The operation of the machine learning unit 30 will be discussed below with reference to FIGS. 1 to 3. The operation illustrated in FIG. 3 is carried out each time the arc welding is performed by the robot 10.

First, at step S11 in FIG. 3, the at least one arc welding condition and the contents thereof (values, etc.) are selected. The contents of the at least one arc welding condition are randomly selected from the respective predetermined ranges.

Alternatively, regarding a certain arc welding condition, the minimum value within the predetermined range may be selected first, and thereafter, a value with a predetermined slight increment may be selected in the next cycle. The same is true for the other arc welding conditions. The operation of FIG. 3 may be repeated so that all possible combinations of all arc welding conditions are selected.

Then, at step S12, at least one physical quantity is selected and a plurality of consecutive data are detected for the selected physical quantity and whether the fluctuation in the plurality of data is large is judged. If the fluctuation is small, that is, the physical quantity is stable, the reward is increased at step S13. Conversely, if the fluctuation is large, it is judged that the physical quantity is unstable, so that the reward is reduced or remains unchanged at step S20.

At step S14, the cycle time and/or the amount of generated spatter are detected and are compared with predetermined values. If the cycle time and/or the amount of generated spatter are less than the respective predetermined values, the reward is increased at step S15. If the cycle time and/or the amount of generated spatter are not less than the respective predetermined values, the reward is reduced or remains unchanged at step S20.

Then, at step S16, whether the welding quality is high is judged. If the welding quality is high, the reward is increased at step S17. Conversely, if the welding quality is not high, the reward is reduced or remains unchanged at step S20.

Note that, whether the welding quality is high or not may be judged based on an image of the weld, etc., or whether the welding quality is high or not may be judged through the presence or absence of the welding failure. If the image of the weld includes, for example, a pit, a burn-through, an undercut, an overlap, uneven bead widths, a meandering bead, a lack of preset necessary leg length, a lack of preset excess weld metal height of the bead, a distortion exceeding a preset allowable distortion, etc., it is judged that the welding failure occurs.

Then, at step S18, the consumption of the welding wire and/or the consumption of energy are detected and compared with respective predetermined values. If the consumption of the welding wire and/or the consumption of energy are less than the respective predetermined values, the reward is increased at step S19. Conversely, if the consumption of the welding wire and/or the consumption of energy are not less than the respective predetermined values, the reward is reduced or remains unchanged at step S20.

The increase or decrease in the reward is computed by the reward computation unit 32. The amounts of increase or decrease of the reward may be set to be different for each step. Moreover, at least one of the judgment steps S12, S14, S16 and S18 and the steps associated therewith to increase or decrease the reward may be omitted.

At step S21, the function update unit 33 updates the action value function. The Q-learning executed by the learning unit 35 is the method for learning the value Q (s, a) (value of action) of selecting the action "a" under a certain environmental state s. In Q-learning, the action "a" which has the highest Q (s, a) under a certain state s is selected. In Q-learning, the various actions "a" are taken under the certain state s by trial and error, and a correct Q (s, a) is learned using the rewards at the respective times. An update expression of the action value function Q (s, a) is represented by the following formula (1).

$$Q(s_t, a_t) \leftarrow Q(s_t, a_t) + \alpha\left(r_{t+1} + \gamma \max_a Q(s_{t+1}, a) - Q(s_t, a_t)\right) \quad (1)$$

wherein $s_t$, $a_t$ represent the environment and the action at time t, respectively. The environment $s_t$ changes to $s_{t+1}$ upon the action $a_t$, and the reward $r_{t+1}$ is computed in accordance with the change of the environment. The term with "max" in the formula is identical to the Q value multiplied by γ when the action "a" having the highest value of Q (known at that time) is selected in the environment $s_{t+1}$. γ represents a discount factor which satisfies 0<γ≤1 (normally, 0.9 to 0.99) and α represents the learning factor which satisfies 0<α≤1 (normally, approximately 0.1).

The update expression means that when the value $Q(s_{t+1}, \max a_{t+1})$ of the best action in the next environmental state by "a" is greater than the value $Q(s_t, a_t)$ of the action "a" in the state s, $Q(s_t, a_t)$ is increased, and conversely when the value $Q(s_{t+1}, \max a_{t+1})$ of the best action in the next environmental state by "a" is less than the value $Q(s_t, a_t)$ of the action "a" in the state s, $Q(s_t, a_t)$ is reduced. Namely, the value of a certain action in a certain state is made to become close to the value of the best action in the next state thereby. In other words, the learning unit 35 updates the state most suitable for the execution of the arc welding, that is, at least one optimum arc welding condition.

As mentioned above, at step S21, the function update unit 33 updates the action value function using the aforementioned formula (1). Thereafter, the control is returned to step S11 where another content of the at least one arc welding condition is selected and the action value function is updated in the same way. Note that, the action value table may be updated in place of the action value function.

In the reinforcement learning, the learning unit 35 as the agent determines the action based on the environmental state. The action in this case means that the decision making unit 34 selects at least one arc welding condition and the contents thereof (values, etc.) so that the arc welding execution unit 37 operates the robot 10, etc., in accordance with the contents. The environment illustrated in FIG. 2, for example, the stability of the physical quantity or the cycle time, etc., changes in accordance with the at least one arc welding condition which has been adjusted in accordance with the contents. As mentioned above, a reward is given to the machine learning unit 30 along with such a change in the environment, so that the decision making unit 34 of the machine learning unit 30 learns the selection (decision) of a better action, for example, so as to obtain a higher reward. As stated above, the learning result is stored in the learning result storage unit 38.

Thus, the reliability of the action value function can be enhanced by repeatedly performing the operations illustrated in FIG. 3 many times. Consequently, at step S11, it is possible to decide the contents of the at least one arc welding condition to be optimum, for example, so as to increase the Q value, based on the highly reliable action value function.

As may be understood from the foregoing, the contents updated by the function update unit 33 of the machine learning unit 30 of the present invention can be automatically determined as the optimum contents of the arc welding condition when carrying out arc welding. Furthermore, the introduction of the machine learning unit machine learning unit 30 in the arc welding robot system 5 and/or the controller 20 thereof makes it possible to automatically prepare the optimum welding condition. As a result, the productivity can be enhanced.

The displacement of the positioner 19 about the first axis 12 and the second axis 14 may be included in the physical quantity determined by the machine learning unit machine learning unit 30. In this case, as the machine learning unit machine learning unit 30 determines the displacement of the positioner 19 optimally, the associated operation of the arc welding by the robot 10 and the positioner 19 can be performed optimally.

Figure 4:
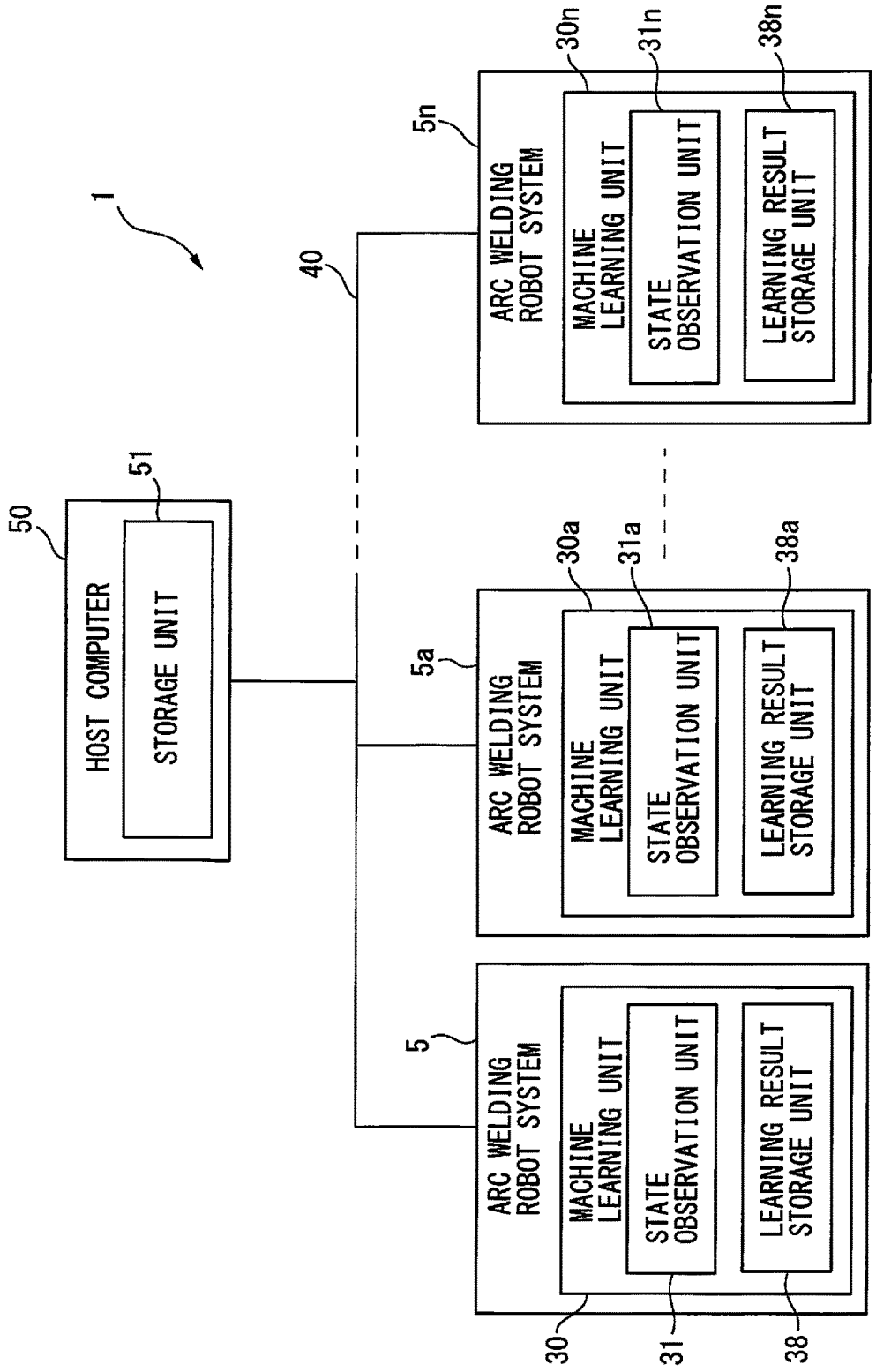
FIG. 4 is a schematic view of a welding system.

FIG. 4 schematically shows the welding system 1. As can be seen in FIG. 4, the welding system 1 includes a plurality of arc welding robot systems 5, 5a to 5n. The arc welding robot systems 5, 5a to 5n respectively include the machine learning unit machine learning units 30, 30a to 30n. The machine learning unit machine learning units 30, 30a to 30n respectively include the state observation units 31, 31a to 31n, and the learning result storage units 38, 38a to 38n, etc., as in the above mentioned embodiment. As may be understood from FIG. 4, the arc welding robot systems 5, 5a to 5n are connected to each other by a communication unit 40. The communication unit 40 is a network which may be either wired or wireless.

By repeatedly carrying out the machine learning, various physical quantities and various arc welding conditions are stored in the state observation unit 31 of the arc welding robot system 5. Likewise, the learning result of the machine learning unit machine learning unit 30 is stored in the learning result storage unit 38 of the arc welding robot system 5

Therefore, even if for example, the machine learning unit machine learning unit 30a of another arc welding robot system 5a has not executed the machine learning, the contents stored in the state observation unit 31 and the learning result storage unit 38 of the arc welding robot system 5 can be incorporated in the state observation unit 31a and the learning result storage unit 38a of the other arc welding robot system 5a through the communication unit 40. Therefore, it is possible to utilize the reliable learning result, etc., without actually executing the machine learning by the machine learning unit 30a of the arc welding robot system 5a. The same is true for the remaining arc welding robot systems 5n, etc.

Moreover, in FIG. 4, a host computer having a storage unit 51, e.g., a server is connected to the communication unit 40 wirelessly or through a wire. Note that, the host computer 50 may be connected directly, for example, to one arc welding robot system 5.

Furthermore, the physical quantities, etc., stored in the state observation unit 31 of the arc welding robot system 5 and the learning result stored in the learning result storage unit 38 of the arc welding robot system 5 may be stored in the storage unit 51 of the host computer 50 through the communication unit 40. In this case, the other arc welding robot system 5a accesses the storage unit 51 of the host computer 50 and incorporates the aforementioned physical quantities, etc., and the learning result into the state observation unit 31a and the learning result storage unit 38a respectively. Namely, it will be appreciated that even if one arc welding robot system 5 is temporarily disconnected from the network, the other arc welding robot system 5a can acquire the aforementioned physical quantities, etc., and the learning result.

Effects of the Invention

According to the first to fifth aspects of the invention, a machine learning device which is capable of automatically determining at least one optimum arc welding condition can be provided.

According to the sixth to tenth aspects of the invention, as the machine learning is adopted to an arc welding control device or an arc welding robot system, at least one optimum arc welding condition can be automatically determined. Accordingly, it is not necessary to carry out ideal welding beforehand in order to define a target value.

According to the eleventh and twelfth aspects of the invention, as the learning result which was obtained by a machine learning device can be incorporated into another machine learning device through a host computer and/or a communication unit, the reliable learning result, etc., can be diverted.

Although the present invention has been discussed above with reference to the representative embodiments, it will be understood by a person skilled in the relevant art that the aforementioned modifications, a variety of other modifications, changes, omission, and addition can be made without departing from the scope of the present invention.

What is claimed is:

1. An arc welding control device, comprising:
 a machine learning device which learns to determine at least one arc welding condition; and
 an arc welding execution unit which executes arc welding in accordance with the determined at least one arc welding condition output from the machine learning device,
 the machine learning device comprising:
  a state observation unit which observes a state variable comprising (i) at least one physical quantity regarding the arc welding at least during or after the arc welding and (ii) the at least one arc welding condition,
   wherein the at least one arc welding condition includes one of an amount of adjustment of a weld waveform, push/drag angles of a welding torch, an aim angle of a welding torch, a torch aim position, a weaving condition, an arc sensor condition, and an offset amount of the welding position in a multi-layer welding, and
   wherein the at least one physical quantity includes at least one of an outer appearance of a weld bead, an excess weld metal height of the weld bead, a bead width of the weld bead, which are obtained by processing image data picked up by an image pickup unit, an amount of generated spatter, and an amount of penetration obtained by a penetration measurement unit; and
  a learning unit which learns to determine the at least one arc welding condition by updating a function that determines the at least one arc welding condition based on the state variable,
   wherein the learning unit comprises (i) a reward computation unit which computes a reward for a result of the determined at least one arc welding condition and (ii) a function update unit which updates the function based on the reward computed by the reward computation unit,
   wherein the at least one arc welding condition is learned so as to increase the reward computed by the reward computation unit, by repeatedly carrying out the updating of the function in the function update unit.

2. The arc welding control device according to claim 1, wherein the reward computation unit includes a reward condition setting unit which sets a reward condition and computes the reward based on the reward condition set by the reward condition setting unit.

3. The arc welding control device according to claim 1, wherein the learning unit further comprises a learning result storage unit which stores a learning result that the function update unit has learned.

4. The arc welding control device according to claim 1, further comprising:
 a decision making unit which decides the at least one arc welding condition and an amount of adjustment of the at least one arc welding condition, from the current state variable, based on a learning result of the learning unit.

5. The arc welding control device according to claim 4, wherein the learning unit learns or repeatedly learns the adjustment of the at least one arc welding condition during the execution of arc welding.

6. An arc welding robot system, comprising:
 a robot which carries out arc welding,
 a physical quantity measurement unit which measures at least one physical quantity regarding the arc welding at least during or after the execution of the arc welding by the robot, and
 an arc welding control device according to claim 4.

7. The arc welding robot system according to claim 6, further comprising a positioner which changes the posture of a workpiece to be welded, wherein the robot and the positioner carry out arc welding while performing operations associated with each other.

8. A welding system, comprising:
 a plurality of arc welding robot systems according to claim 6, and
 a communication unit which mutually connects the plurality of arc welding robot systems,
 wherein the communication unit transmits and receives at least one of at least one physical quantity observed by at least one state observation unit and the learning result stored in at least one learning unit among the plurality of arc welding robot systems.

9. The welding system according to claim 8, further comprising a host computer connected to the communication unit, wherein at least one of the at least one physical quantity observed by the at least one state observation unit and the learning result stored in the at least one learning unit among the plurality of arc welding robot systems is stored in the host computer.

10. The arc welding control device according to claim 1, wherein
 the function update unit updates the function by using the following formula $$Q(s_t, a_t) \leftarrow Q(s_t, a_t) + \alpha\left(r_{t+1} + \gamma \max_{a} Q(s_{t+1}, a) - Q(s_t, a_t)\right) \quad (1)$$

where $s_t$ and $a_t$ represent environment and action at time t, respectively, Q(s,a) is a value of selecting action a under environmental s, r is the reward computed in accordance with a change of the environment, $\gamma$ represents a discount factor which satisfies $0<\gamma\leq 1$, and $\alpha$ represents a learning factor which satisfies $0<\alpha\leq 1$.

* * * * *